United States Patent [19]

Fischer et al.

[11] Patent Number: 5,806,510
[45] Date of Patent: Sep. 15, 1998

[54] BARBECUE TRAY

[76] Inventors: Klaus Fischer, 5710 Windchase Dr.;
Peter Casey, 2618 Ridge Hurst Dr.,
both of Buford, Ga. 30518

[21] Appl. No.: 727,373

[22] Filed: Oct. 8, 1996

[51] Int. Cl.⁶ ..................................................... F24C 5/00
[52] U.S. Cl. ...................... 126/51; 126/41 R; 126/25 R; 126/9 B; 126/332; 126/334
[58] Field of Search ..................................... 126/51, 41 R, 126/913, 25 R, 332, 334

[56] References Cited

U.S. PATENT DOCUMENTS

| | | | |
|---|---|---|---|
| 3,474,724 | 10/1969 | Jenn | 126/41 R X |
| 4,667,652 | 5/1987 | Bunton | 126/41 R |
| 5,070,776 | 12/1991 | Schlosser et al. | 126/41 R X |
| 5,313,877 | 5/1994 | Holland | 126/41 R X |

*Primary Examiner*—Larry Jones
*Attorney, Agent, or Firm*—Isaf, Vaughan & Kerr; Charles H. Fails

[57] ABSTRACT

A tray for use with a barbecue having one or more griddles partly or wholly outlying or able to outlie the base of the barbecue wherein the tray is locatable beneath the griddles or the parts of griddles outlying the base to direct fat falling therefrom to the base is described. The tray is particularly suitable for use with multi-level hooded barbecues.

14 Claims, 5 Drawing Sheets

FIG. 6A  FIG. 6B

BARBECUE TRAY

FIELD OF THE INVENTION

The present invention relates to a barbecue tray.

BACKGROUND OF THE INVENTION

Barbecues have a base, from which usually the heat is provided either by gas, electricity or wood/charcoal, and one or more griddles thereabove on which the food, usually meat, is located. One popular form of modern barbecue is a multi-level hooded barbecue having a hinged lid, wherein one or more of the griddles are part-connected to the inside of the lid. When not in use, the lid protects the barbecue from the weather. The open lid allows food to be located easily on all the griddles and also allows slower cooking of the food on the upper griddles. The lid can also be closed during cooking or closed to keep cooked food warm. For this, the lid is flanged outwardly at its rear from its edging with the base to allow air circulation and the exhaustion of fumes in the barbecue, and to ensure rain cannot run into the barbecue.

However, the rear flanging also means any fat (or grease) collected on it falls outside the barbecue. When the lid is open, fat from food on those parts of the upper griddles which lie beyond the base of the barbecue but above the lid falls directly onto the rear of the lid. When the lid is then closed the fat falls to the ground creating an unpleasant mess, which can ruin e.g. a patio surface, and which attracts insects. The need to open and close the lid regularly during cooking exacerbates the problem, as does any fat sprayed against the back of the lid by food located on the main cooking griddles.

It is an intention of the present invention to obviate or mitigate these disadvantages.

SUMMARY OF THE INVENTION

According to one aspect of the present invention, there is provided a tray for use with a barbecue having one or more griddles partly or wholly outlying or able to outlie the base of the barbecue wherein the tray is locatable beneath the griddles or the parts of griddles outlying the base to direct fat falling therefrom to the base.

The tray may be permanently attached to the barbecue, e.g. by rivets, but it is preferably removably attached or located. It can be removed e.g. for easy cleaning or storage. The tray is also preferably usable with existing barbecues.

According to one embodiment of the present invention, the tray is located on the base of the barbecue by one or more support clips which clip or slide onto the barbecue base. The support clips may be of any suitable design, e.g. spring or slotted clips. Preferably, they are easily locatable onto the base of a barbecue and provide easy placement and removal of the tray. The tray may be attached to the clips or be separate but supported thereby. The support clip(s) may allow rotation of the tray to alter its angle of plane, i.e. it or they may act like hinges The clips may also be adjustable to allow them to fit barbecues of different sizes or shapes.

In use, the tray is located beneath those griddle(s) or parts of griddle(s) which outlie the base of the barbecue, and it preferably directs all or substantially all the fat which falls therefrom into the base. The tray preferably extends wholly or substantially beneath the outlying parts of the griddle(s) and over an edge of the base such that fat thereon runs directly into the base.

The fat directed by the tray into the base may be burnt by the heating means in the base, or collected in a grease-tray in or near the base, possibly along with other collected fat. Burning the fat may enhance the flavour of the food and reduce cooking time by the extra heat created therefrom. The tray may be adapted to direct fat directly onto the heating means. The tray and/or barbecue may also include guiding means to guide the fat along a particular path, e.g. to avoid the cooking area. The fat could also be directed to a collecting facility separate from the base, and such is included in the scope of the present invention.

According to another embodiment of the present invention, the tray is for use with a multi-level hooded barbecue. Such barbecues commonly have one or more griddles part-attached to the lid, parts of which outlie the base of the barbecue when the lid is open. The tray is preferably located inside the rear of the lid (or its base when open), and directs fat from the griddles above to the rear of the base of the barbecue. More preferably, the tray is maintained within the lid when it is closed, and rests or is supported against the rear of the lid. Such a tray assists convection of heat to the upper griddles, enhancing the flavour of the food and reducing cooking time. It may also reduce heat loss from the rear of the barbecue. The tray is preferably hinged or otherwise rotatably supported at or near a front edge to allow it to be maintained within the lid.

When the tray of the present invention is located within the lid of a multi-level hooded barbecue, when closed it is essential that the tray still allows fumes to be exhausted from the barbecue during cooking, and maintains proper ventilation of the barbecue. Thus the tray is adapted or designed to still allow fumes and air to pass through the flange of the rear of the lid, preferably by allowing such airflow to pass under and/or behind the tray.

The tray of the present invention may be flat, or it may be otherwise shaped to match or accommodate the arrangement of the barbecue.

The term "fat" as used herein includes grease and any other unwanted but collectable side product of the food being cooked.

The tray of the present invention and any support clips may be made from any suitable material(s), e.g. steel. The material should be able to withstand temperatures of e.g. 1000–1200° F.

According to a second aspect of the present invention, there is provided a barbecue having a tray as described hereinbefore. Preferably, the barbecue is a multi-level hooded barbecue.

Embodiments of the present invention will now be described by way of example only and with reference to the accompanying drawings.

BRIEF DESCRIPTION OF THE DRAWINGS

FIGS. 6a, 6b and 6c are end, side and plan views respectively of the support clips in FIGS. 5a and 5b.

DETAILED DESCRIPTION OF THE DRAWINGS

Figure 1:
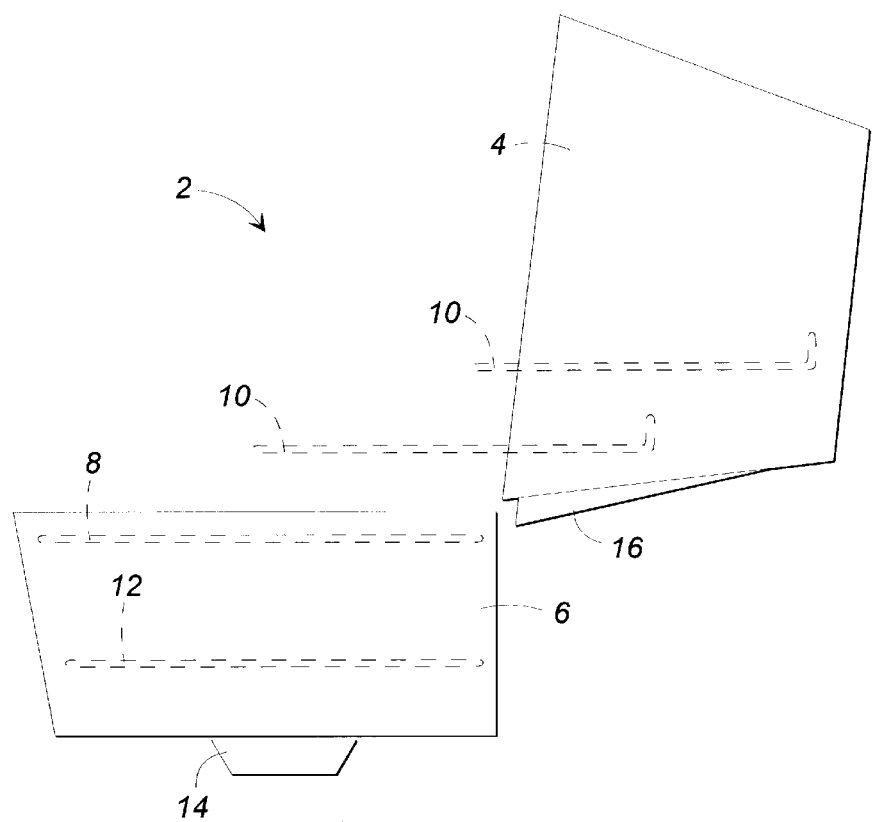
FIGS. 1 and 2 are cross-sectional side views of a prior art multi-level hooded barbecue with its lid open and closed respectively.
Figure 2:
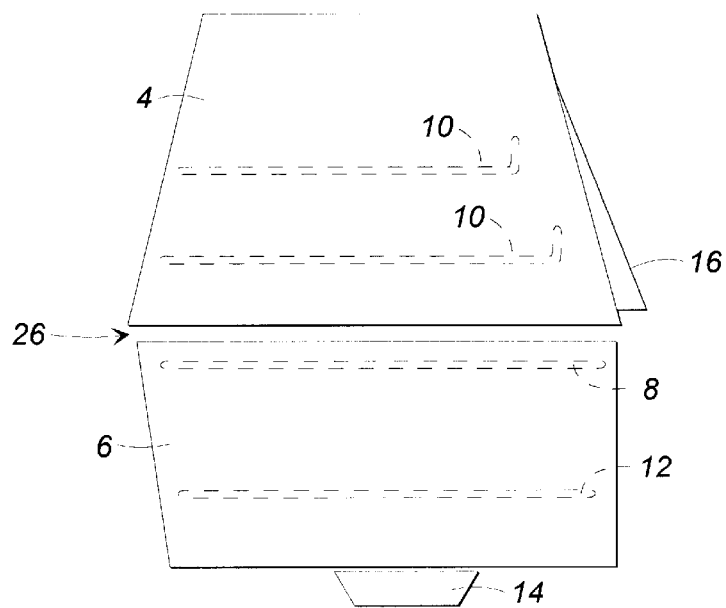

Referring to the drawings, FIGS. 1 and 2 show a prior art multi-level hooded barbecue 2 with its lid in an open and closed position. The barbecue 2 has a lid 4, base 6, a lower griddle 8 and two upper griddles 10. The upper griddles 10 are rotatably attached to the lid 4 at one end and to the base 6 (or lower griddle) at the other end, such that they move with the lid 4 upon its opening to allow easy access to all the griddles 8,10. In the base 6 are gas burning plates 12, and beneath the base 6 is a fat collecting tray 14.

When the lid 4 is open, either during or after cooking, fat from the food on those parts of the upper griddles 10 outlying the base 6 will fall onto the rear of the lid 4. At the rear of the lid 4 is a flange 16 which allows air to circulate within the barbecue 2 when the lid 4 is closed, and allows fumes, e.g. smoke, to be exhausted therefrom. These requirements are essential to the design of hooded barbecue 2. However, because the flange 16 extends beyond the rear of the lid 4, fat landing on it when the lid 4 is open will fall from it to the ground, especially when the lid 4 is then closed. The lid 4 is regularly opened and closed during cooking. This fat will create an unpleasant mess on the ground.

Figure 3:
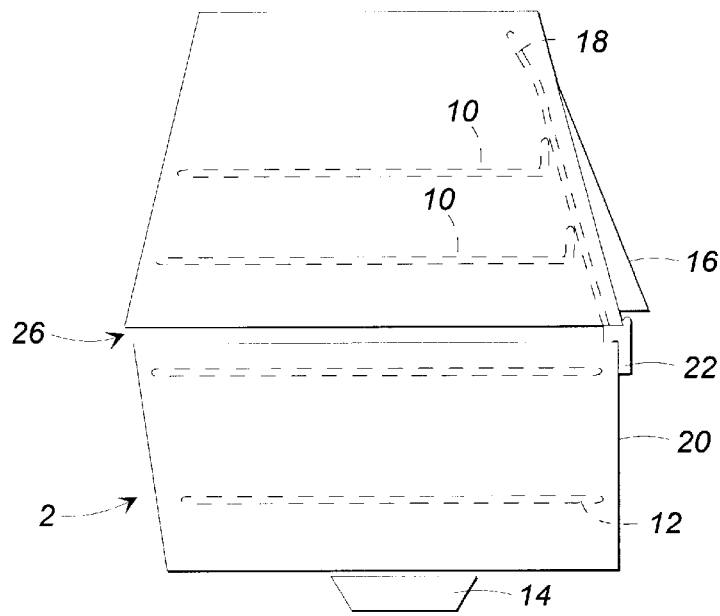
FIGS. 3 and 4 are cross-sectional side views of the barbecue of FIGS. 1 and 2 respectively with a tray according to one embodiment of the present invention.
Figure 4:
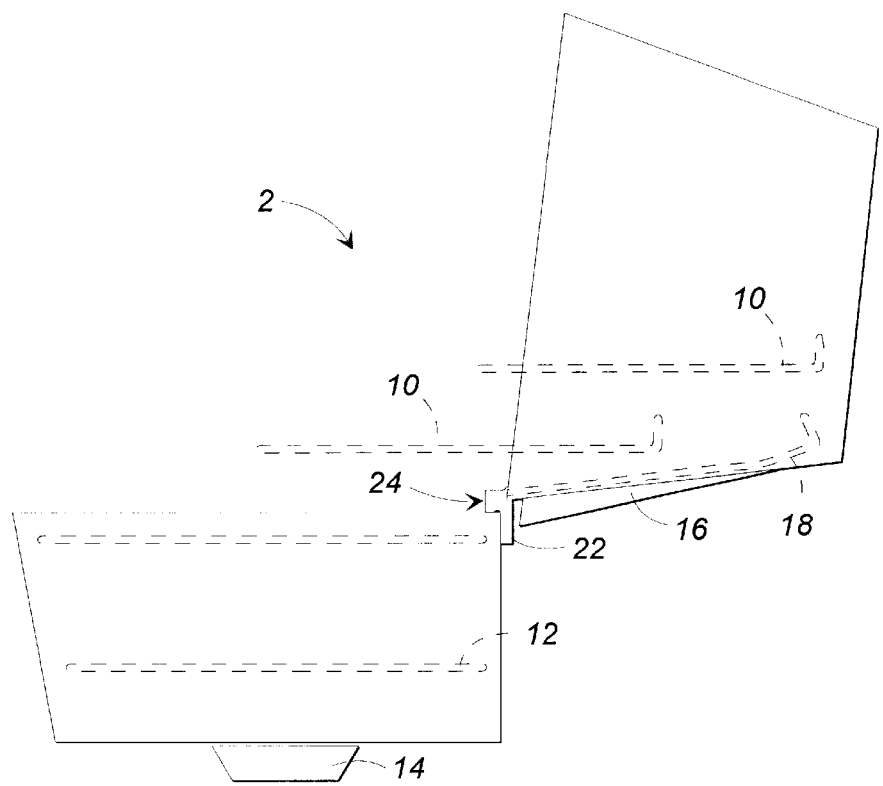

FIGS. 3 and 4 show the barbecue 2 of FIGS. 1 and 2 with a tray 18 according to one embodiment of the present invention. As shown in FIG. 4, the tray 18 is located beneath those parts of the upper griddles 10 which outlie the base 6 when the lid 4 is opened. The tray 18 is also located over the flange 16 and over the rear edge of the barbecue 2, e.g. by 15 mm. Fat from food on those parts of the upper griddles falls onto the tray 18, which, being at an angle, can direct the fat over the rear edge of the base 6 and thereinto by gravity. More commonly, fat will fall from the tray 18 when the lid 4 is closed, i.e. when the angle of the tray 18 is very much more upright. The fat may be burnt on the burning plates 12 or collected in the collecting tray 14. The tray 18 is shaped to fit around the upper griddles 10 and to match the shape of the inside of the lid 4, so that upon closing the lid 4, the tray 18 is accommodated therein as shown in FIG. 3. As shown in FIG. 3, the tray 18 also prevents any fat collecting on the inside of the flange 16 during cooking; said fat collects on the tray 18 and runs down to the base 6.

The tray 18 is supported on the rear edge 20 of the base 6 of the barbecue 2 by support clips 22. The tray 18 is supported such that a gap 24 of e.g. 25 mm exists between the rear edge 20 of the base 6 and the tray 18, especially for when the lid 4 is closed. The gap 24 still allows air to circulate and fumes to be exhausted under the tray 18 and through the flange 16 in the rear of the lid 4. Indeed, this gap 24 may create a chimney effect enhancing the extraction of fumes from the rear of the barbecue 2 when the lid 4 is closed. The front edge of the tray may also be bent forwardly to create or increase the clearance between the tray and the rear parts of the lid 4 and base 6.

Figure 7:
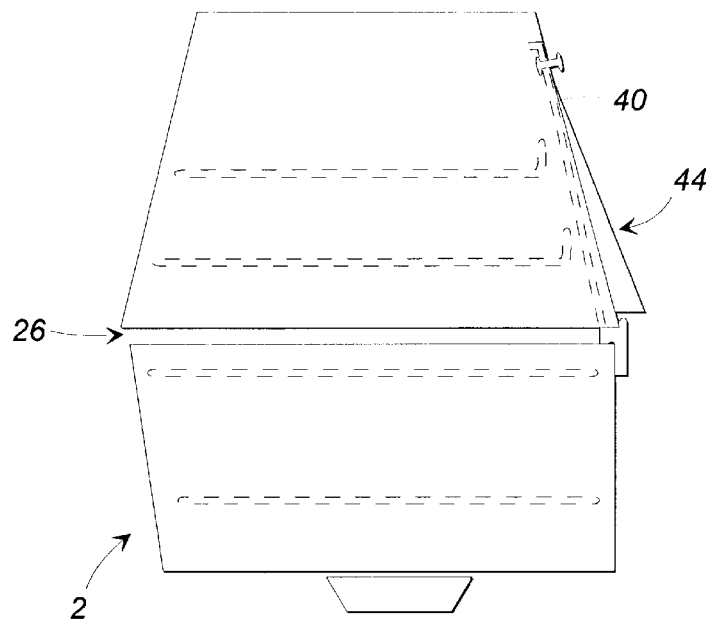
FIGS. 7 and 8 are cross-sectional side views of the barbecue of FIGS. 1 and 2 respectively with a tray according to a further embodiment of the present invention.

The gap 26 between the base 6 and the lid 4 in FIGS. 2, 3 and 7 is shown for clarity of parts only and does not exist in practice.

Figure 5:
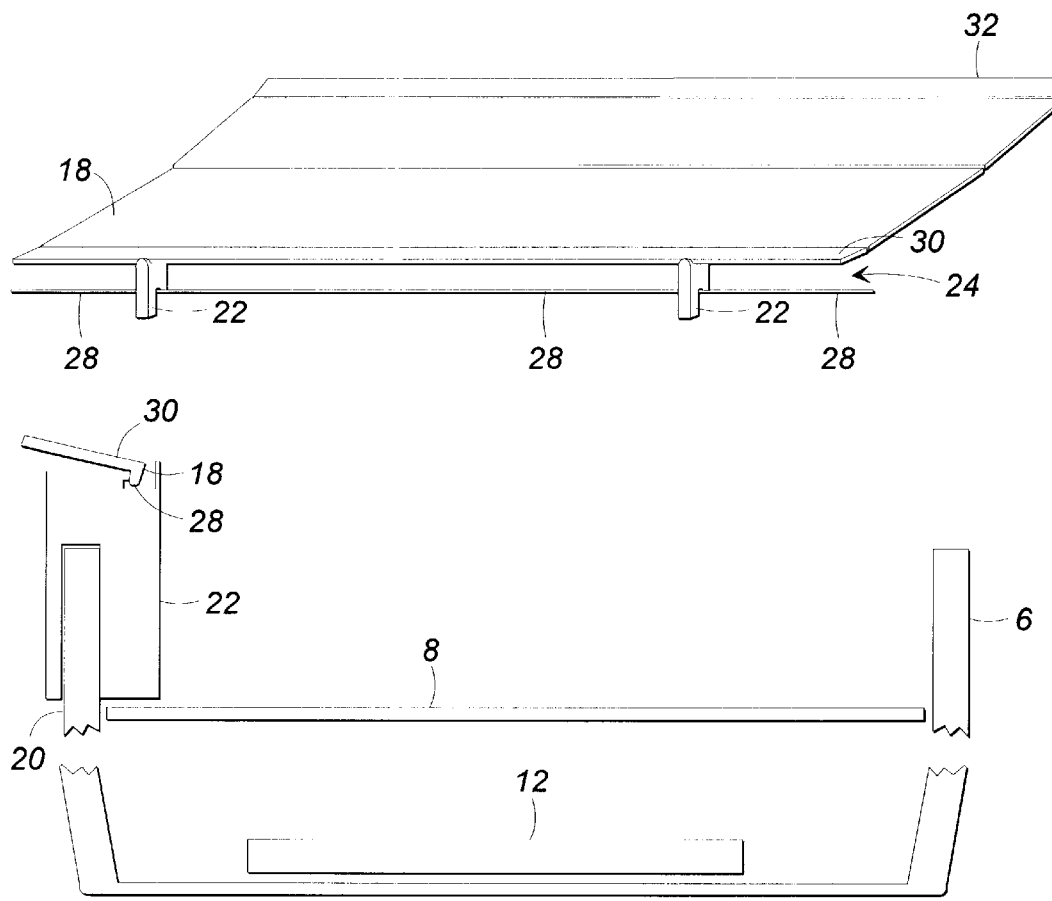
FIG. 5 is a perspective and cross-sectional side view respectively of the tray of the present invention with support clips and a barbecue.

FIGS. 5a and 5b show the support clip 22 and tray 18. Two support clips 22 fit between the tray 18 and the rear edge 20 of the barbecue 2. The tray 18 has a depending rim 28 on its front edge 30 over which fat falls into the base 6. The front edge 30 is bent forwardly to assist the gap required between the tray 18 and the rear edge 20 of the base 6 for ventilation etc. The rear parts 32 of the tray 18 are angled, eg. at 5°–10°, to accommodate the tray 18 within the lid 4, and to create a more efficient draft within the barbecue 2 when the lid 4 is closed during cooking as shown in FIG. 3. This also allows the tray 18 to slide smoothly into the back of the lid 4 when it is being closed.

Figure 6C:
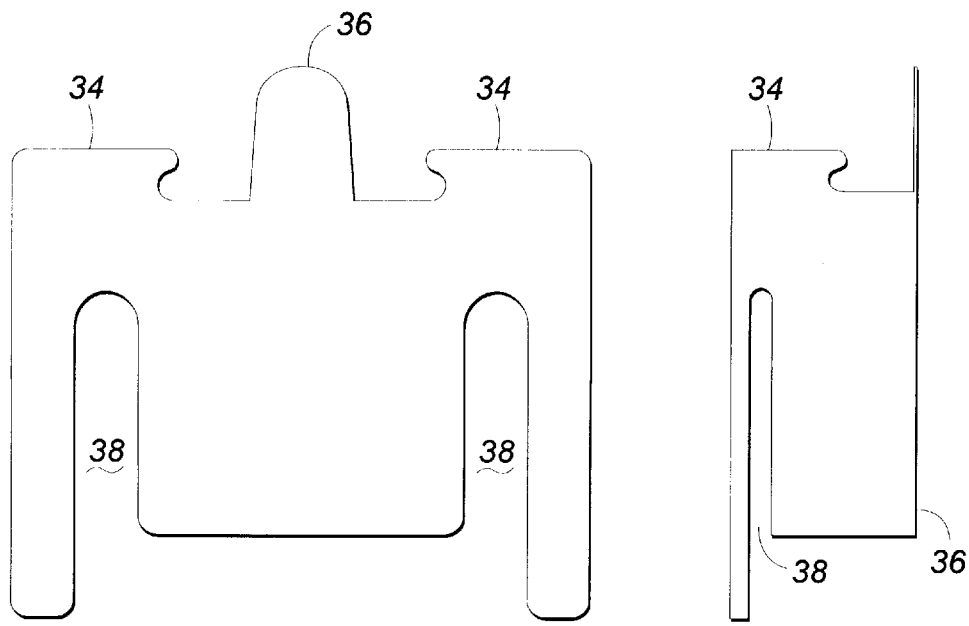
Figure 6C:
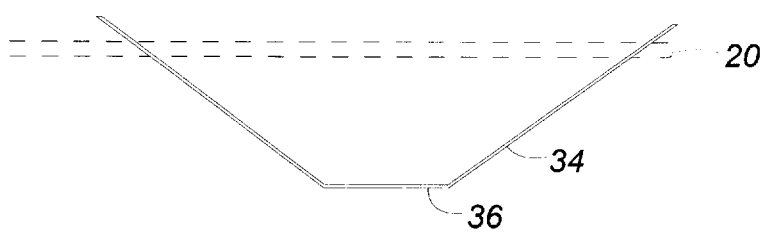

FIGS. 6a–6c show the support clip 22 in more detail. The clip 22 has two wings 34 extending from a central spine section 36. In the wings 34 are vertical slots 38 adapted to fit the clip 22 slidingly onto the rear edge 20 of the barbecue 2 (shown in dotted line). Indents in the top edges of the wings 34 and an extension of the top of the spine 36 support the front edge 30 and depending rim 28 of the tray 18, and they are shaped so as to continue to support the tray 18 when it is in a more vertical position when the lid 4 is closed. The clips 22 also stop the tray 18 from going forward, e.g. where the upper griddles 10 would not stop it otherwise. This is especially where a barbecue has a warming/upper griddle(s) which is only suspended from its lid.

The clips 22 allow easy installation of the tray 18 onto the barbecue 2, and easy removal of the tray 18 e.g. for cleaning. The clips 22 are simplistic in design for ease of manufacture, installation and use. The clips 22 and tray 18 can be installed onto existing barbecues.

Figure 8:
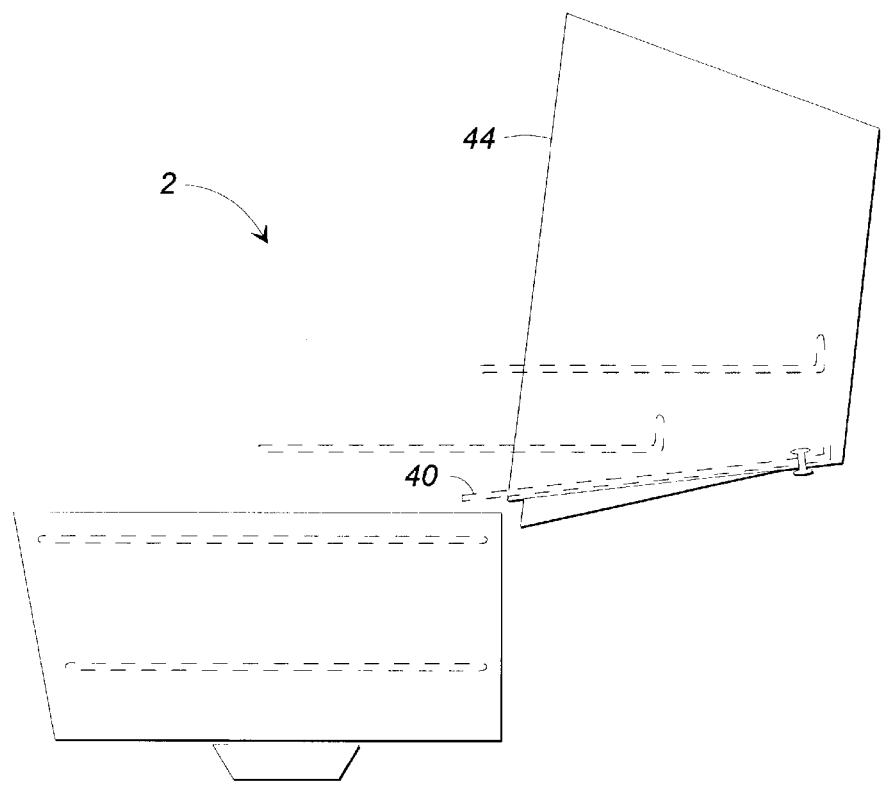

FIGS. 7 and 8 show the barbecue 2 of FIGS. 1 and 2 with an alternative tray arrangement. The tray 40 is riveted to the lid 44 near the top of the rear of the lid.

The tray as shown in the accompanying drawings is adapted to be used with the majority of existing hooded barbecues. Its design, shape and size could easily be altered to fit any other barbecue, whether hooded or not.

The tray of the present invention is designed to direct fat from cooking or cooked barbecue food toward the base of the barbecue which would otherwise fall to the ground. It is particularly suitable for use with multi-level hooded barbecues, where it is adapted to maintain the circulation and exhaust requirements. The tray also makes a hooded barbecue more efficient by improving convection of heat to upper levels and by substantially reducing heat loss from the rear of the barbecue. The tray may also improve the flavour of the food by burning the fat during cooking.

Variations and modifications can be made without departing from the scope of the invention described above.

While a preferred embodiment of the invention has been disclosed in the foregoing specification and drawings, it will be understood by those skilled in the art that variations and modifications thereof can be made without departing from the spirit and scope of the invention, as set forth in the following claims.

We claim:

1. A barbecue tray for use with a barbecue, the barbecue having a base with at least one upstanding side wall and at least one upstanding rear wall formed as a part thereof, a heating means disposed within the base for cooking food placed on the barbecue, a fat collecting tray depending from the base for collecting the liquid fat and grease resulting from the cooking of food on the barbecue, and a hooded lid pivotally supported on the rear wall of the base and being sized and shaped to be moved from an open position into a closed position on the base for generally enclosing the base, the barbecue also having at least one griddle at least partially supported on the lid and which lies above the rear wall of the base and extends at least partially beyond the rear wall of the base when the lid is in its open position, said barbecue tray comprising a planar tray constructed and arranged to be removably supported on the rear wall of the base, said tray being positioned beneath the at least one griddle so that said tray extends beneath that portion of the at least one griddle which extends beyond the rear wall of the base in the open position of the lid, said tray being sized and shaped to direct the liquid fat and grease resulting from the cooking of the food on the barbecue toward and into the base, and wherein said tray is supported on the rear wall of the base of the barbecue by a pair of spaced support clips .

2. The tray as claimed in claim 1 wherein said tray is removably attached to the rear wall of the barbecue.

3. The tray as claimed in claim 1 wherein each of said support clips is constructed and arranged to be fastened to the base of the barbecue.

4. The tray as claimed in claim 1 wherein said support clips are constructed and arranged to support said tray and wherein said support clips are not formed as a part of said tray.

5. The tray as claimed in claim 4 wherein the tray is rotatably supported at or near its front edge on said pair of support clips.

6. The tray as claimed in claim 1 wherein the tray extends substantially beneath the at least one griddle and over the edge of the rear wall of the base.

7. The tray as claimed in claim 6 wherein the liquid fat directed by the tray into the base is burnt by the heating means in the base.

8. The tray as claimed claim 1 wherein the tray is constructed for use with a multi-level hooded barbecue lid.

9. The tray as claimed in claim 8 wherein the tray is positioned inside the rear of the lid.

10. The tray as claimed in claim 8 wherein the tray is positioned within the lid when the lid is closed.

11. The tray as claimed in claim 1 wherein the tray is constructed and arranged to allow fumes to be exhausted from the barbecue and to maintain proper ventilation of the barbecue during cooking.

12. The tray as claimed in claim 1 wherein the tray is sized and shaped to match the shape of the lid.

13. The tray as claimed in claim 1 wherein the front edge of the tray is profiled to increase the gap between the tray and the base.

14. A barbecue tray for use with a barbecue, the barbecue having a base with upstanding rear wall, a cooking burner disposed within the base for cooking food placed on the barbecue, a hooded lid pivotally supported on the rear wall of the base, the lid being sized and shaped to move from an open position into a closed position on the base for generally enclosing the base, and at least one griddle pivotally supported on the lid, the at least one griddle lying above the rear wall of, and at least partially extending beyond the rear wall of the base when the lid is in its open position, said barbecue tray comprising:

a planar tray constructed and arranged to be removably supported on the rear wall of the base, said tray being positioned beneath the at least one griddle so that said tray extends beneath that portion of the at least one griddle which at least partially extends beyond the rear wall of the base when the lid is in its open position;

said tray being sized and shaped to direct the liquid fat and grease resulting from the cooking of the food on the barbecue toward and into the base.

* * * * *